US005769067A

United States Patent [19]

Mandeville et al.

[11] Patent Number: 5,769,067

[45] Date of Patent: Jun. 23, 1998

[54] AIR HEATER AND HUMIDIFIER USING DIRECT CONTACT HEATING PRINCIPLES AND METHOD OF OPERATION

[76] Inventors: Luc Mandeville, 1995 Maisonneuve Street, Terrebonne, Quebec, Canada, J6X 2T7; Michel Dallaire, 1797 Cambrai Street, St-Bruno-de-Montarville, Quebec, Canada, J3V 3J4; Kébir Ratnani, 205 De Bayeux Street, Boucherville, Quebec, Canada, J4B 7T9

[21] Appl. No.: 724,041

[22] Filed: Sep. 23, 1996

[51] Int. Cl.[6] .......... F24F 3/14

[52] U.S. Cl. .......... 126/113; 126/360 A; 126/350 B; 122/5.52; 261/17; 261/148

[58] Field of Search .......... 126/113, 360 A, 126/350 B; 432/222; 122/5.52, 367.4; 261/17, 148

[56] References Cited

U.S. PATENT DOCUMENTS

| | | | |
|---|---|---|---|
| 2,759,328 | 8/1956 | Cockrell | 122/5.52 |
| 3,755,990 | 9/1973 | Hardison | 261/17 |
| 4,039,307 | 8/1977 | Bondor | 261/17 |
| 4,050,912 | 9/1977 | Hemsath et al. | 261/17 |
| 4,765,280 | 8/1988 | Kobayashi et al. | 261/17 |

*Primary Examiner*—Carroll B. Dority

[57] ABSTRACT

An air heating and humidifying system and method using direct contact heating principles. The system consists in providing a source of hot water by feeding hot flue gases in a direct contact water heater and wherein the water sprayed over a packing in the water heater is heated as it percolates through the packing and is in contact with the hot rising flue gases. This hot water from the direct contact water heater is used in a direct contact air treating chamber wherein it is sprayed over a further packing whereby to heat and humidify fresh air which is pushed through the packing by a fan and exits at an outlet flue of the treating chamber to supply hot moist fresh air in a building air conditioning system. The cooled water in the direct contact air treating chamber is collected and supplies the spray nozzle of the direct contact water heater to cool the hot flue gases which are rising therein and thereby enhances considerably the efficiency of the direct contact water heater.

20 Claims, 2 Drawing Sheets

TO BUILDING DUCT NETWORK

COLD WATER

CONTROL

CTRL

FAN 30 74 75 73 70 71 38 34 43 33 31 32 35 36 37 72 76 47 46 45 40 40' 41 42 44 48 54 53 61 62 63 63' 66 66' 65 59 58' 51 50 52 55 58 56 57 60

TO BUILDING
DUCT NETWORK
CTRL
CONTROL
FAN
COLD WATER 30
31
32
33
34
35
36
37
38
40
40'
41
42
43
44
45
46
47
48
50
51
52
53
54
55
56
57
58
58'
59
60
61
62
63
63'
65
66
66'
70
71
72
73
74
75
76

AIR HEATER AND HUMIDIFIER USING DIRECT CONTACT HEATING PRINCIPLES AND METHOD OF OPERATION

TECHNICAL FIELD

The present invention relates to an air heater and humidifier using direct contact heating principles and to the method of operation of the system.

BACKGROUND ART

Various types of direct contact water heaters are known and wherein a spray of water is released on a packing of heat exchange bodies and through which passes hot gases from a burner chamber usually located adjacent to the bottom of the water heater above a hot water reservoir. Accordingly, the water droplets heat up as they percolate down the water heater to the reservoir. Such a water heater is, for example, described in U.S. Pat. No. 5,293,861.

The present invention concerns the use of such direct contact water heater principles in a novel system whereby to provide sources of hot humidified air originating from fresh air which is fed in a direct contact air treating chamber where it is heated and humidified by hot water. It is mandatory in many countries of the world to admit fresh air in the heating system of a building for the comfort of people who work or live therein. It is known that fresh air penetrates and can be admitted in a building through cracks or other type openings and this constitutes a source of fresh air for its occupants. However, with today's building construction standards, such openings are insufficient and therefore fresh air from the outside must be brought into the heating system. Because outside air is very dry in the winter months and most humidification systems are insufficient, it is necessary to humidify this air as it is heated.

SUMMARY OF INVENTION

It is a feature of the present invention to provide an air heating and humidifying system using direct contact heating principles whereby to provide sources of hot humidified fresh air which can be produced from outside dry air.

Another feature of the present invention is to provide an air heating and humidifying system using direct contact heating apparatus capable of also producing hot water supplies for feeding heat exchangers used in domestic or commercial applications.

Another feature of the present invention is to provide an air heating and humidifying system using direct contact heating apparatus and employing a single gas burner and wherein the flue gases from the burner are efficiently cooled to provide a high efficiency direct contact water heating system.

Another feature of the present invention is to provide a method of producing hot humidified fresh air using the direct contact water heating principles.

Another feature of the present invention is to provide a method of producing hot humidified air using the direct contact water heating principle while at the same time producing sources of hot water capable of being used in heat exchangers used in domestic or commercial applications.

Another feature of the present invention is to provide a method of producing hot humidified air using the direct contact water heating principles and simultaneously producing a source of hot water as well as efficient cooling of the hot flue gases to produce a very high efficient direct contact water heating system.

According to the above features, from a broad aspect, the present invention provides an air heating and humidifying system using direct contact heating apparatus. The system comprises a direct contact water heater having heat exchange means therein. A water spray means is disposed above the heat exchange means to supply water thereto and to cause water to percolate through the heat exchange means and heat by contact therewith. A hot gas heat supply is provided below the heat exchange means for heating the heat exchange means and water percolating downwards to a reservoir below the heat supply to produce a supply of hot water. The cooled flue gases rising through the heater are exhausted through a flue. Pump means is provided to direct hot water from the reservoir above a further heat exchange means in a direct contact air treating chamber to heat and humidify dry air passing through a further heat exchange means to provide a supply of hot fresh moist air at an outlet port of the air treating chamber.

According to a further broad aspect of the present invention there is provided a method of producing hot humidified air using direct contact heating principles. The method comprises the steps of providing a source of hot flue gases as a heat source for a direct contact water heater whereby to produce a supply of hot water from a source of cooler water released over a packing of heat exchange bodies to extract heat from the hot flue gases rising through the direct contact water heater prior to be exhausted through an exhaust flue. Hot water is fed from the supply of hot water to a further direct contact water heater to release same on a further packing of heat exchange bodies in the further direct contact water heater. A supply of cool dry air is fed below the further packing to extract heat and humidity from water released in the further direct contact water heater and percolating through the packing whereby to provide a supply of hot moist fresh air at an outlet port of the further direct contact water heater to feed an air conditioning conduit network of a building.

BRIEF DESCRIPTION OF DRAWINGS

A preferred embodiment of the present invention will now be described with reference to the accompanying drawings in which.

DESCRIPTION OF PREFERRED EMBODIMENTS

Figure 3:
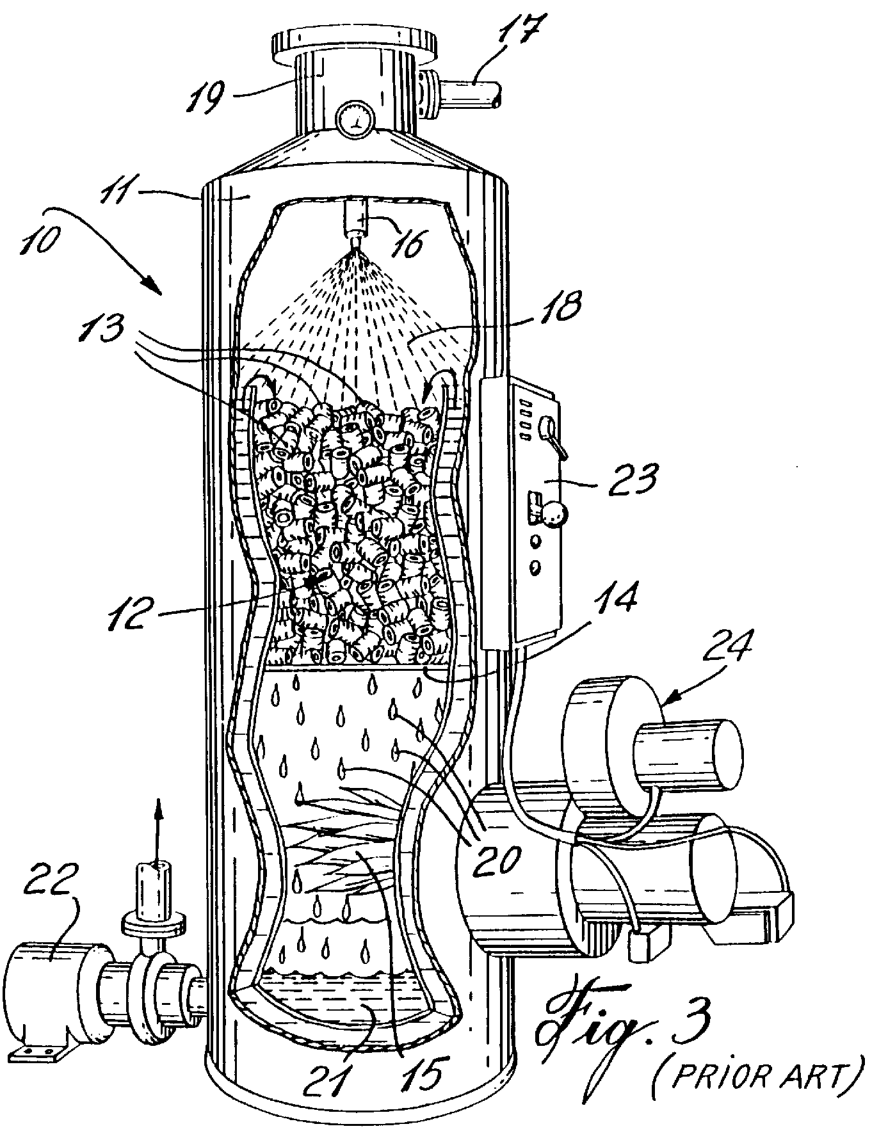
FIG. 3 is a fragmented perspective view showing a typical direct contact water heater column of the prior art.

Referring to the drawings and more particularly to FIG. 3, there is shown, generally at 10, a typical direct contact water heater of the prior art and which consists of a casing 11 in which a packing 12 of heat exchange bodies 13 is supported elevated therein by a support platform 14 through which hot gases emanating from the burner flame 15 rise. The casing 11 may have various workable shapes such as cylindrical, rectangular, etc. A spray nozzle 16 is supplied with water through an inlet conduit 17 and this water is sprayed at 18 over the packing 12 whereby water droplets will be exposed to rising hot gases and percolate through the heat exchange bodies 13 which have been heated by the hot flue gases rising through the packing and exiting through the outlet flue 19. The hot water droplets 20 are collected at the bottom of the casing 11 in a reservoir 21. A pump 22 feeds the hot water for domestic or commercial use. The temperature of the hot flame 15 is controlled by a control panel 23 which monitors the gas burner 24. This principle of producing hot water is integrated in a novel air heating and humidifying system as will now be described with reference to FIGS. 1 and 2.

Figure 1:
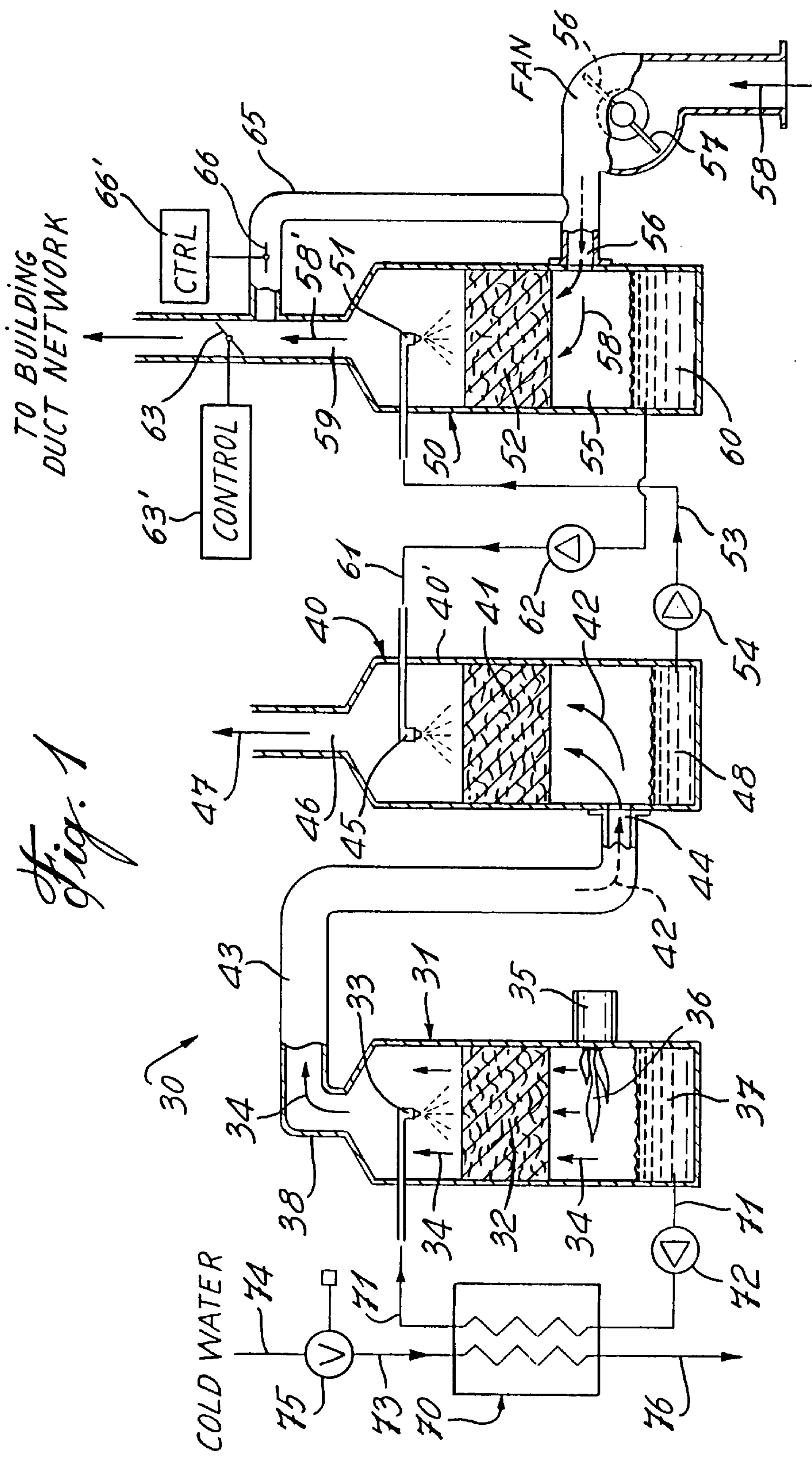
FIG. 1 is a schematic diagram of the air heating and humidifying system of the present invention using direct contact air heating principles.

Referring now to FIG. 1, there is generally shown at 30 the air heating and humidifying system of the present invention. As hereinshown, the system utilizes a first direct contact water heater 31 which is provided with a packing 32, as in the prior art, constituting a heat exchange means. A water spray nozzle 33 is disposed above the packing and sprays water over the hot flue gases 34 rising through the packing. A gas burner 35 is positioned below the packing 32 and generates a hot flame 36 which produces these hot gases. Heated percolating water droplets are collected at the base of the direct contact water heater 31 in a reservoir 37.

As hereinshown the hot flue gases 34 at the outlet port 38 of the first direct contact water heater 31 are directed to a further direct contact water heater 40 which is also provided with a packing 41 but this time the heat exchange bodies within the packing 41 are heated by the exhaust flue gases entering the housing 40', as indicated by arrow 42, and present at the outlet duct 38 of the first direct contact water heater 31. A conduit 43 interconnects the outlet duct 38 to an inlet duct 44 positioned below the packing 41 of the further direct contact water heater 40. A spray nozzle 45 releases cool water droplets over the packing 41 whereby to cool the hot flue gases 42 as they rise within the cylindrical casing 40' of the further direct contact water heater whereby the flue gases released from the outlet port 46 are cooled sufficiently to provide exhaust gases at 47 from which heat has been effectively extracted thereby resulting in an efficiency which could reach 100%. The water droplets released from the spray nozzle 45 are heated and dried as they come in contact with the hot rising flue gases and heat exchange bodies in the packing 41. These hot water droplets are collected in a reservoir 48 at the bottom of the cylindrical casing 40'.

The hot water collected in the reservoir 48 is fed to a nozzle 51 located in the top end of a direct contact air treating housing or chamber 50 where it is released over a still further packing 52 of heat exchange bodies which are heated by the water spray. This hot water is fed to the nozzle 51 through a conduit 53 having a pump 54 connected thereto.

As hereinshown the direct contact air treating chamber 50 is provided with a dry air inlet chamber 55 below the packing 52. A fresh air inlet conduit 56 is connected to a fan 57 which blows fresh outside air, as indicated by arrows 58, within the dry air inlet chamber 55. As the fresh air rises through the packing and comes in contact with the hot water droplets emanating from the spray nozzle 51, it is heated and humidified whereby to be released through an outlet duct 59 and within an air conditioning conduit network (not shown) of a building to be air conditioned. As the fresh air rises through the cylindrical casing 50', it is heated and the water percolating through the packing is cooled by heat exchange with the cold fresh air. This cooled water is collected in a reservoir 60 formed at the base of the cylindrical casing 50'. This reservoir of cooler water is connected by conduit 61 and pump 62 to the spray nozzle 45 of the further or second direct contact water heater 40 to provide the supply of cold water.

As can be seen in FIG. 1, the reservoir of hot water 48 in the further direct contact water heater 40 is connected in a closed circuit with its spray nozzle 45 through the spray nozzle 51 and reservoir 60 of the direct contact air treating chamber 50, and this water is continuously circulated when the fresh outside air needs to be warmed and humidified. Of course, in the summer mode of operation, these pumps 54 and 62 are rendered inoperative and fresh air is admitted to the conduit network by the fan 57 which blows outside air directly to the outlet conduit 59 and into the duct network. A damper 63 is mounted in the outlet conduit 59 to control the volume of fresh conditioned air admitted into the duct network.

As is also shown in FIG. 1, a feedback conduit 65 is connected between the outlet port 59, below the damper 63, and the dry air conduit 56 whereby to admit a controlled quantity of hot humid air from the outlet port 59 back into the dry air conduit 56 to warm the conduit and the fan 57 to prevent icing when the supply of fresh air is at a temperature below freezing. A further damper 66 is secured within the feedback conduit 65 to control the feedback volume. Each of the dampers 63 and 66 are connected to control motors 63' and 66' respectively and these may be automatically controlled from a central control panel (not shown).

Referring again to the first direct contact water heater 31, it can be seen that one or more external heat exchangers 70 may be branched in a closed loop circuit formed by conduit 71 and pump 72 and connected between the hot water reservoir 37 and the spray nozzle 33. Accordingly, the very hot water present in the reservoir 37 is pumped through the heat exchanger 30 where heat from the water is exchanged with cold water fed through the heat exchanger 70 from conduit 73 which may be connected to the city supply line 74 through a valve 75. Hot water at the outlet conduit 76 of the heat exchanger 70 can then be fed to feed a hot water tank for domestic use or may be fed to other commercial devices such as laundry apparatus or other processes. As pointed out one or more of these heat exchangers 70 may be connected in seriesor in parallel arrangement. The heat exchangers 70 may also be a series of radiators to heat air.

Figure 2:
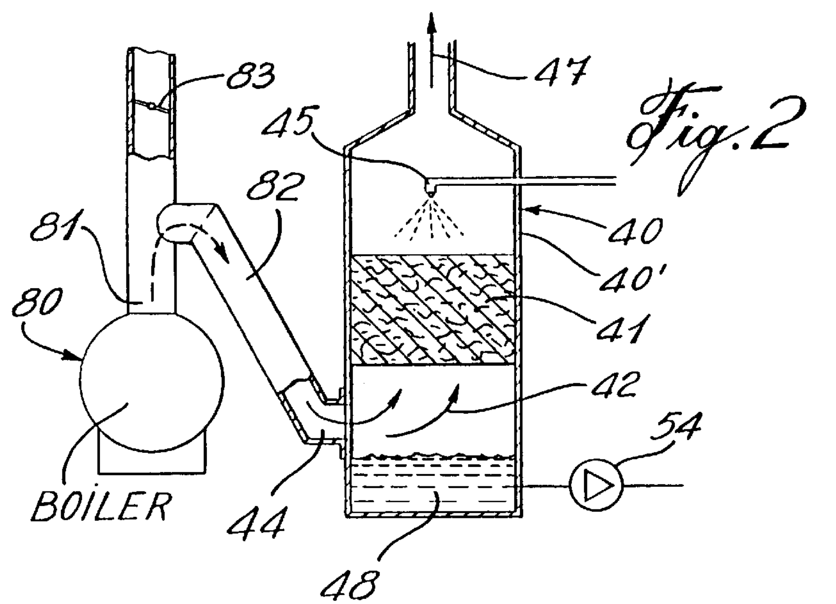
FIG. 2 is a schematic diagram showing a modification of FIG. 1.

Referring now to FIG. 2, there is shown a further modification of the system 30. As illustrated, the hot exhaust flue gases 42 fed to the inlet conduit 44 of the cylindrical casing 40' herein originate from an external boiler 80 which serves in another application, such as a laundry. The hot flue gases 42 at the outlet flue 81 of the boiler can be directed through an interconnecting flue pipe 82 to the inlet port 44 of the further direct contact water heater 40 by closing a damper valve 83 in the outlet flue 81 above the conduit connection 82. Accordingly, in this application the system becomes very efficient as the exhaust flue gases from the boiler are recovered and provide the heating source for the further direct contact water heater 40. These flue gases are sufficiently cooled to produce a system of very high efficiency in the range of 100%.

Briefly summarizing the method of operation, there is provided a heat source which generates hot flue gases 42 while producing a supply of hot water 48 from a source of cooler water released through the spray nozzle 45 and released over the packing 41 of heat exchange bodies whereby to extract heat from the hot flue gases 42 rising through the direct contact water heater cylindrical casing 40'. These hot flue gases are released through the exhaust flue 46 and these have been sufficiently cooled to achieve high efficiency. The hot water from the supply of hot water 48 is fed to a further spray nozzle 51 to be released over a further packing 52 of heat exchange bodies in a further direct contact air treating chamber or casing 50, 50' as shown in FIG. 1. A supply of fresh air 58 is fed below the packing 52 to extract heat and humidity from hot water which is released in a spray into cylindrical casing 50' and which percolates through the packing 52 to provide a supply of hot moist fresh air at 58' at the outlet port 59 of the air trating chamber 50 whereby to feed an air conditioning duct network of a building. The method also encompasses all of the other aspects of the operation of the system above-described.

It is within the ambit of the present invention to cover any obvious modifications of the examples of the preferred embodiment described herein, provided such modifications fall within the scope of the appended claims.

We claim:

1. An air heating and humidifying system using direct contact heating apparatus, said system comprising a direct contact water heater having heat exchange means therein, a water spray means above said heat exchange means to supply water thereto and to cause water to percolate through said heat exchange means and heat by contact therewith, a hot gas heat supply below said heat exchange means for heating said heat exchange means and water percolating downwards to a reservoir below said heat supply to produce a supply of hot water, a flue to exhaust cooled flue gases from said water heater, pump means to direct hot water from said reservoir above a further heat exchange means in a direct contact air treating chamber to heat and humidify fresh air passing through said further heat exchange means to provide a supply of hot moist fresh air at an outlet port of said air treating chamber.

2. An air heating and humidifying system as claimed in claim 1 wherein there is further provided conduit feed means to supply cooled water from a reservoir compartment of said further direct contact air treating chamber to said water spray means.

3. An air heating and humidifying system as claimed in claim 2 wherein said direct contact air treating chamber is a housing formed as a vertical column and having a spray nozzle positioned adjacent a top end thereof to spray water from said reservoir in droplets over said heat exchange means therein, said reservoir compartment being located at a bottom end of said column spaced below said heat exchange means in said air treating chamber to define therebetween a fresh air inlet chamber, and a fresh air conduit secured to said housing and communicating with said fresh air inlet chamber to feed a supply of fresh air therein.

4. An air heating and humidifying system as claimed in claim 3 wherein said outlet port is located in a top end of said vertical column above said spray nozzle, and damper means in said outlet port to regulate the supply of hot moist fresh air from said housing.

5. An air heating and humidifying system as claimed in claim 4 wherein there is further provided a feedback conduit connected between said outlet port below said damper means and said fresh air conduit, and a further damper means in said feedback conduit to control the feedback volume of hot moist fresh air back into said fresh air conduit to warm said conduit to prevent icing therein when said supply of fresh air is at a temperature below freezing.

6. An air heating and humidifying system as claimed in claim 3 wherein said heat exchange means of said direct contact water heater and said direct contact air treating chamber are packagings of heat exchange bodies.

7. An air heating and humidifying system as claimed in claim 1 wherein said hot gas heat supply is constituted by hot exhaust flue gases provided from a further hot gas generating apparatus.

8. An air heating and humidifying system as claimed in claim 7 wherein said further hot gas generating apparatus is a further direct contact water heater having a gas burner as a heat source to heat water percolating through a still further heat exchange means and in contact with hot rising gases from said heat source to provide a reservoir of hot water, a further water spray means above said further heat exchange means, said further direct contact water heater having an exhaust flue conduit at an upper end thereof and connected to said direct contact water heater below said heat exchange means to constitute said hot gas heat supply.

9. An air heating and humidifying system as claimed in claim 7 wherein said further hot gas generating apparatus is a remote boiler having an outlet duct feeding said hot gas heat supply to said direct contact water heater.

10. An air heating and humidifying system as claimed in claim 8 wherein there is further provided one or more external heat exchanger means interconnected in a closed circuit between said supply of hot water and said water spray means disposed above said heat exchange means of said further direct contact water heater, pump means in said closed circuit to circulate hot water from said supply of hot water through said one or more heat exchanger means for heat exchange with cold water to heat said cold water to produce a hot water supply, said water in said closed circuit at an output of said external heat exchange means being reheated when sprayed in droplet form by said water spray means on said further heat exchange means of said further direct contact water heater.

11. An air heating and humidifying system as claimed in claim 10 wherein said further heat exchange means of said further direct contact water heater is a packing of heat exchange bodies, said burner being a natural gas burner.

12. An air heating and humidifying system as claimed in claim 5 wherein said supply of hot gases at said exhaust flue of said further direct contact water heater are high temperature hot moist gases, said high temperature hot moist gases being cooled by contact with said cooled water sprayed on said heat exchange means as they rise through said direct contact water heater whereby to exit said flue of said direct contact water heater as cooled flue gases and achieving high efficiency heat recovery.

13. An air heating and humidifying system as claimed in claim 4 wherein said fresh air conduit is provided with a fan and has an inlet port to admit outside air therein to introduce fresh air into said fresh air inlet chamber, said outlet port at said top end of said vertical column being connected to an air conditioning duct network of a building whereby to supply a building with hot humidified fresh air.

14. A method of producing hot humidified air using direct contact heating principles, said method comprising the steps of:

i) providing a source of hot flue gases as a heat source for a direct contact water heater whereby to produce a supply of hot water from a source of cooler water released over a packing of heat exchange bodies to extract heat from said hot flue gases rising through said direct contact water heater to be exhausted through an exhaust flue, ii) feeding hot water from said supply of hot water to a further direct contact water heater to release same on a further packing of heat exchange bodies in said further direct contact water heater, iii) feeding a supply of fresh air below said further packing to extract heat and humidity from a hot water spray released in said further direct contact water heater and percolating through said packing to provide a supply of hot moist fresh air at an outlet port of said further direct contact water heater to feed an air conditioning duct network of a building.

15. A method as claimed in claim 14 wherein said source of hot flue gases in step (i) is obtained from a still further direct contact water heater having a gas burner as a heat source, and producing in said still further direct contact water heater a further supply of hot water.

16. A method as claimed in claim 15 wherein there is further provided the step of recirculating, in a closed circuit between a reservoir of said further supply and a spraying device disposed above a packing of heat exchange bodies in said still further direct contact water heater, hot water from said further supply of hot water through an external heat exchange device for heating a cold water supply to produce hot water for domestic or commercial use.

17. A method as claimed in claim 14 wherein said source of cooler water is obtained by collecting in a reservoir of said further direct contact water heater water cooled by said supply of fresh air; and feeding said cooled water by pump means to a spraying device disposed above said further packing whereby to cool said hot flue gases rising therein to achieve improved heat exchange efficiency at said exhaust flue.

18. A method as claimed in claim 14 wherein there is further provided the step (iv) of feeding back through a feedback conduit a portion of said hot moist fresh air from said further direct contact air treating chamber to a conduit through which said supply of fresh air is fed by blower means associated with said conduit to prevent icing when said fresh air is at a temperature below freezing.

19. A method as claimed in claim 18 wherein there is further provided the step of regulating the flow of said hot moist fresh air through said outlet port and the further step of regulating said portion of said hot moist fresh air fed back through said feedback conduit.

20. A method as claimed in claim 14 wherein said source of hot flue gases in step (i) is obtained from the step of directing hot flue gases from the outlet flue of an external device through conduit means connected to said direct contact water heater below said packing of heat exchange bodies.

* * * * *